US006314564B1

(12) United States Patent
Charles et al.

(10) Patent No.: US 6,314,564 B1
(45) Date of Patent: Nov. 6, 2001

(54) METHOD FOR RESOLVING ARBITRARILY COMPLEX EXPRESSIONS AT LINK-TIME

(75) Inventors: David K. Charles; Gerald S. Williams, both of Macungie, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 08/968,156

(22) Filed: Nov. 17, 1997

(51) Int. Cl.⁷ ..................................................... G06F 9/45
(52) U.S. Cl. ..................................... 717/10; 717/8; 717/9
(58) Field of Search ................................... 395/710, 709, 395/575, 708, 717

(56) References Cited

U.S. PATENT DOCUMENTS

| | | | |
|---|---|---|---|
| 5,193,180 | | 3/1993 | Hastings ................................. 717/10 |
| 5,287,490 | * | 2/1994 | Sites ..................................... 395/500 |
| 5,317,740 | * | 5/1994 | Sites ..................................... 395/700 |
| 5,404,555 | * | 4/1995 | Liu ....................................... 395/800 |
| 5,507,030 | * | 4/1996 | Sites ..................................... 395/800 |
| 5,551,035 | | 8/1996 | Arnold et al. ......................... 709/315 |
| 5,592,600 | | 1/1997 | DePauw et al. ...................... 345/440 |
| 5,613,120 | * | 3/1997 | Paley et al. ........................... 395/710 |
| 5,649,203 | * | 7/1997 | Sites ..................................... 395/709 |
| 5,805,461 | * | 9/1998 | Fant et al. ............................. 364/488 |

OTHER PUBLICATIONS

IEEE Standard for Microprocessor Universal Format for Object Modules, IEEE Std 695–1990, Feb. 1991.*
Unix System V, Release 4, Programmer's Guide: ANSI C and Programming Support Tools, Prentice–Hall, Inc. , Englewood Cliffs, New Jersey, 1990, pp. 13–30–13–39.

* cited by examiner

Primary Examiner—Mark R. Powell
Assistant Examiner—Hoang-Vu Antony Nguyen-Ba
(74) Attorney, Agent, or Firm—Synnestvedt & Lechner LL

(57) ABSTRACT

A method of resolving arbitrarily-complex expressions during the linking operation of an object file is disclosed. This is accomplished by including stack operations in the relocation entries of relocatable object files. By adding stack operations to the relocation entries, postfix notation (also known as "reverse Polish notation") can be utilized to allow the resolution of the arbitrarily-complex expressions during the linking operation and within the object file itself.

24 Claims, 3 Drawing Sheets

FIG. 1
(PRIOR ART)

| FIELD NAME | r_offset | r_info | | r_addend |
|---|---|---|---|---|
| FIELD DECRIPTION | DATA OFFSET | RELOCATION TYPE | SYMBOL | ATTEND (OFFSET VALUE) |
| SAMPLE TEXT | GOTO INSTRUCTION | GOTO RELOCATION | LABEL1 | NONE |
| SAMPLE CODE | 3 | 4 | 2 | 0 |

FIG. 2

| | OFFSET | RELOCATION TYPE | SYMBOL | ADDEND |
|---|---|---|---|---|
| LINE 1 | 3 (GOTO INSTRUCTION) | 1 (PUSH) | 2 (LABEL1) | 0 |
| LINE 2 | 3 (GOTO INSTRUCTION) | 1 (PUSH) | 3 (LABEL2) | 0 |
| LINE 3 | 3 (GOTO INSTRUCTION) | 2 (BINARY EVALUATE) | 0 | 2 (SUBTRACT) |
| LINE 4 | 3 (GOTO INSTRUCTION) | 1 (PUSH) | 0 | 4 (IMMEDIATE VALUE) |
| LINE 5 | 3 (GOTO INSTRUCTION) | 2 (BINARY EVALUATE) | 0 | 4 (DIVIDE) |
| LINE 6 | 3 (GOTO INSTRUCTION) | 3 (POP) | 0 | 4 (GOTO RELOCATION) |

METHOD FOR RESOLVING ARBITRARILY COMPLEX EXPRESSIONS AT LINK-TIME

FIELD OF THE INVENTION

This invention relates to the resolution of arbitrarily-complex expressions as a computer program is linked together, rather than at run-time. Specifically, the present invention enables relocation values in relocatable object files to be specified as arbitrarily-complex expressions.

BACKGROUND OF THE INVENTION

Large software systems are commonly divided into components called modules. These modules, usually organized into files called object files (one module per file), must be tied to one another to form executable files before they operate. Before a program can be loaded into an end-user's computer for use it must be compiled, that is, converted from source code format in which the programmer typically writes the program to object code format which will be recognized by the end-user's computer. It must also be linked, which includes computing proper addresses of all modules which comprise the compiled program. The output of compiling is usually one or more relocatable object files which are combined during linking into a single executable program. Linking cannot be completed until all modules (object files) are fully defined.

Like most programs, an object file comprises lines of code which instruct the computer to carry out specific functions. Quite often an instruction within the object file will make reference to another instruction within the same or another object file. For example, an instruction might tell the computer to go to a particular address in the object file (e.g., line 4) and perform a function.

A problem arises when two or more object files are linked. Since each object file is created independently of the other object files, the addresses used in one file will bear no relationship to those of another. For example, if an object file has a starting address of 50, the code addresses for that file will progress upward in sequence (e.g., 51, 52, 53, etc.). When several object files are linked to form an executable file, each line of code in the object files that make up the executable file are assigned new addresses within the executable file. Thus, when a line of code from the object file tells the computer to go to line 52 and perform an operation, line 52 of the executable file may not be the desired line.

To solve this problem, relocatable object files are used. A relocatable object file is assigned addresses relative to memory location zero. Thus, since the first memory location is a known constant, the location of each line of code in a particular object file can be calculated and the instruction that directs the computer to a particular line can be adjusted accordingly to reflect the location of the line within the executable file in which the object file is used. This allows a programmer to code sections of programs without being concerned about the final arrangement of the code when it is linked to form the executable file.

An assembler is used to generate a relocatable object file, and the linker then combines the data from the object files. If an instruction or data item within an object file makes reference to another instruction or data item with the same or another object file, this reference may have to be updated. This is traditionally accomplished through the use of relocation entries.

Each relocation entry consists of three or four fields. The fields identify what data is going to have to be updated, identify a symbol that will eventually point to the correct address for updated data, define how to change the data to be relocated, and identify the offset value (the amount to add or subtract from the data to be relocated) if needed. Relocation entries are capable of being "extended" so that the files in which the relocation entries reside can be customized to function with a particular piece of hardware (e.g., a Pentium processor).

It is desirable to run digital signal processors (DSP's) and other microprocessors typically used in embedded applications as fast as possible; thus, it is preferable to reduce the number of operations that are required during the execution stage (run time) of operation. To achieve this, as many operations as possible should be performed during "build time", which is the compile time and/or link-time, as opposed to the run time, since timing is not as critical during the building of the application as it is during run time.

Arbitrarily-complex expressions are algebraic expressions that have no artificial limits on nesting depth or the use of particular operators or data items. In software systems, arbitrarily-complex expressions involving relocatable labels can only be resolved at link-time or at run-time because the final values of those labels are not known until the object files are linked together. Generally, expressions in source or object files that involve symbolic labels and that are resolved at link time are limited to simple expressions (e.g., a label plus an immediate value), if such expressions are able to be resolved at all. Linking is the last step in the creation (building) of an executable program and is normally performed by a tool called a linker or loader. Since most object file formats are not capable of representing arbitrarily-complex expressions as relocation values, current development tool sets usually require that arbitrarily-complex expressions be independently specified to the linker through a linker control file, if they are to be performed at link-time.

A linker control file is an additional file that independently instructs the linker how to compute the arbitrarily-complex expressions. Relocation entries in the object file produced by the assembler instruct the linker how to use the results of the computation. Using linker control files requires additional user intervention to specify the arbitrarily-complex expression when linking. Whereas object files are deliberately written so that they can be used repeatedly for different functions, the linker control file is an extra file that has to be written, debugged and edited each time a group of object files are linked. Additional symbols are required to support the linker control file expressions. Further, the linker control files cannot be used within object files that are stored as modules within library archives, and the linker control files cannot be used in dynamically linked libraries (DLL's), since both contain only module data and the values in the linker control file will change with each application. Use of linker control files also makes programs more error-prone, since they require the programmer to write the linker control file in order to create "dummy" symbols. The programmer also has to modify the source program to make reference to the dummy symbols. The linker has to obtain information from both the linker control file and the relocation entry. This places limitation on the ability of the linker to, determine if there are any conflicts between the obtained information and other information in the program (e.g., multiple uses of the same symbols or definitions of a symbol in an object file instead of in a linker control file).

If arbitrarily-complex expressions could be built into the object file during build time, then there would be better performance during run-time. Conventional relocation entries are incapable of representing such expressions, however. Thus, if such expressions can be specified at all, they must be explicitly specified to the linker through some other means, such as the above-mentioned linker control file method.

Specifying arbitrarily-complex expressions directly in the object files would make building programs easier and less error-prone, and would allow libraries of object files to be self-contained and include any expressions that they use in the object file itself. It would also allow expressions to be used in conjunction with deferred (e.g., dynamic) linking, such as using a dynamically linked library (DLL) whose final address is not known until just before it is used.

Previous attempts to encode expressions into traditional object files have revolved around using strings of characters to represent expressions. This requires reserving a place in the object file to store the strings, and the linker must parse and reinterpret the strings in order to resolve them. This is a time consuming operation which may introduce errors, since the linker is reinterpreting the expression, including symbol names which may not be unique. Conventional standard object file formats do not support such expression strings, which leads to non-standard variants.

SUMMARY OF THE INVENTION

The present invention takes advantage of the ability to extend the relocation entries of object files by including stack operations in the relocation entries. Specifically, by adding PUSH, POP, and EVALUATE operations to the relocation entries, postfix notation (also known as "reverse Polish notation") can be utilized to allow the resolution of arbitrarily-complex expressions during the linking operation and within the object file itself.

In one embodiment, the standard PUSH operation can be used to push a symbol or label onto the stack. This is appropriate when the format of the program allows the use of an addend field. In formats that do not support the addend field, a PUSH IMMEDIATE operation can be used to push a value onto the stack. The stack operations are added to the relocation entries without modifying the object file format. This means that tool developers and end users can use standard object file formats (e.g., ELF or COFF) using standard tools or libraries for accessing them.

BRIEF DESCRIPTION OF THE DRAWING

FIG. 1 is a table showing a relocation entry of the prior art;

FIG. 2 is a table showing relocation entries according to the present invention.

DETAILED DESCRIPTION OF THE PREFERRED EMBODIMENT

Figure 3:
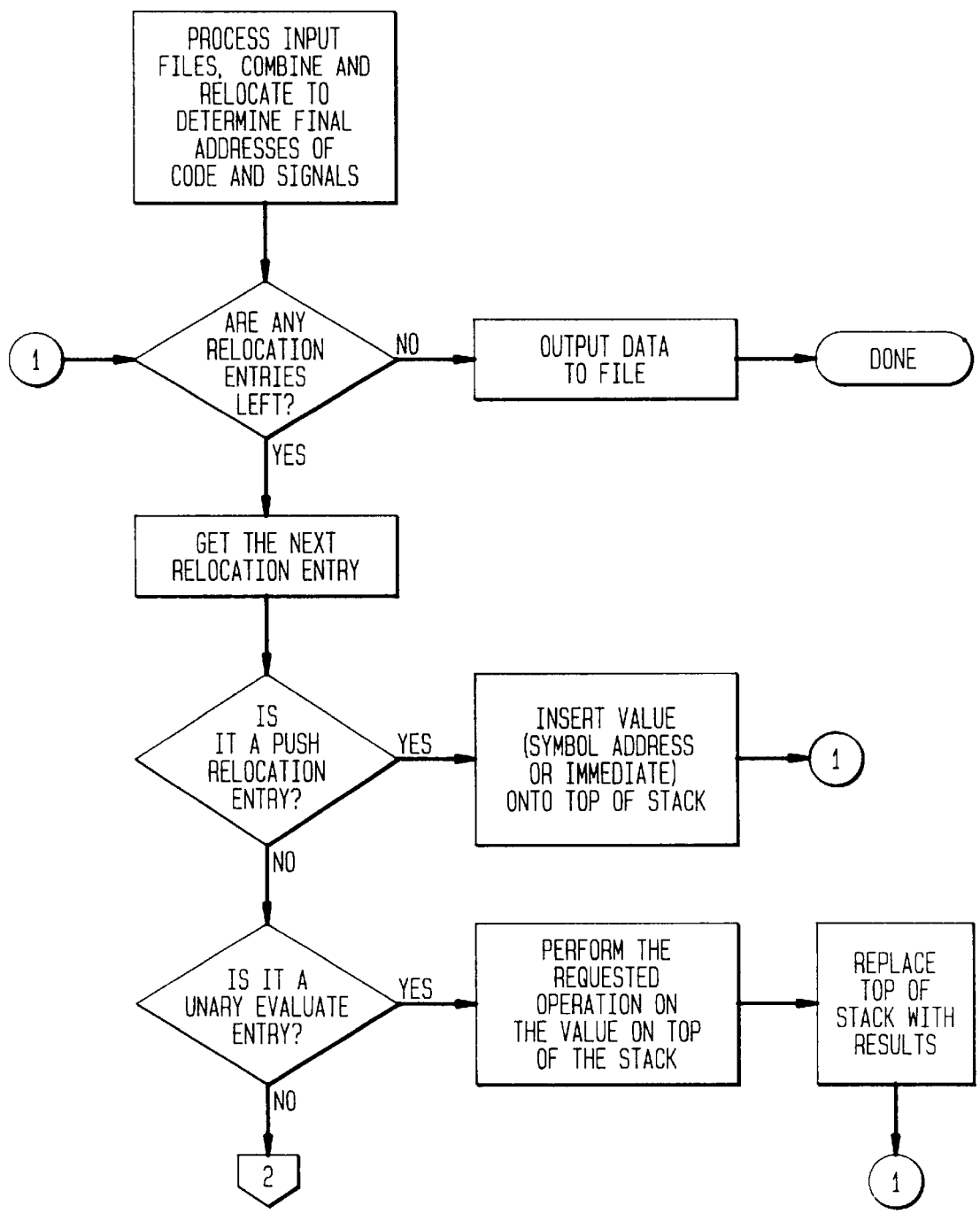
FIGS. 3 and 3A are a flowchart of the operation of the present invention.

FIG. 1 shows an example of a prior art relocation entry format in a prior art relocatable object file. In this example, the ELF (Executable and Linking Format) format is utilized; thus, conventional ELF field names (e.g. r_offset) are shown.

Referring to FIG. 1, line 1 shows a data pointer, known as a "data offset," at column 10. The ELF field name is "r_offset". This datum identifies the location at which to apply the relocation action (e.g., the example in FIG. 1 points to a "GOTO instruction" reference). For a relocatable file, the value of the offset is expressed in the object file as a byte offset or instruction offset to the storage unit affected by the relocation e.g., if the GOTO instruction reference is the third instruction in the object file, it is coded as "3" as shown.

Column 20 illustrates the ELF field "r_info". This field identifies both the relocation type to apply e.g., "GOTO relocation", and the symbol table index with respect to which the relocation must be made, e.g. LABEL1.

Column 30 illustrates the ELF field "r_addend", which, under conventional operation specifies a constant addend used to compute the value to be stored in the relocate field. For example, in the above example, if the source program contained "GOTO LABEL1 +5", the addend's value would be 5. Since the example in FIG. 1 shows an addend of 0, the source program coded therein reads "GOTO LABEL1".

The above explanation illustrates the conventional instructions that are found in the relocation entries of a conventional relocatable object file. Suppose, however, that the source program contains "GOTO (LABEL1–LABEL2)/4". Under the prior art methods, a linker control file would have to be created to perform the arithmetic calculations (subtract and divide), with the result from the linker control file calculations being used in the object file. According to the present invention, instead of having to create and invoke a linker control file to perform the subtraction and division operations, stack commands are used directly in the relocation type field of the relocation entry to enable the resolution of these arithmetic operations. A stack is a well-known way to store data such that the last object put on the stack is the first object retrieved (also called LIFO, for last-end-first-out). Stack operations are commonly used, for example, by Hewlett-Packard calculators to calculate arithmetic expressions, taking advantage of postfix (reverse Polish) notation.

Referring to FIG. 2, according to the present invention, for the operation "GOTO (LABEL1–LABEL2)/4", the stack command "PUSH LABEL1" pushes the value corresponding to LABEL1 onto a stack maintained by the linker. Next, the stack command "PUSH LABEL2" pushes the value corresponding to LABEL2 onto the stack, on top of the LABEL1 value. "Binary EVALUATE" at line 3 causes the execution of the mathematical operation "SUBTRACT" on the top two items on the stack (i.e., LABEL1–LABEL2). This replaces the LABEL1 and LABEL2 items on the stack with the result of the subtraction.

At line 4, the stack command "PUSH 4" pushes the divisor, in this case, a "4", onto the stack. At line 5, "Binary EVALUATE" causes the execution of the mathematical operation "DIVIDE" on the top two items on the stack, and replaces the top two stack items with the result of the division. Finally, at line 6, "POP" removes the result and the "GOTO relocation" moves it to the proper location for updating the GOTO instruction.

If the GOTO instruction is the third instruction in the object file; LABEL1 and LABEL2 are the second and third symbols, respectively, referenced in the symbol file (the file that contains the symbol definitions); PUSH, EVALUATE, POP and GOTO Relocation are relocation types 1, 2, 3, and 4, respectively, referenced in a "relocation type file" (a file that contains the relocation type definitions); the "Binary EVALUATE SUBTRACT" and "Binary EVALUATE DIVIDE" are the second and fourth operations, respectively, in the "Binary EVALUATE Operation" file (a file that contains the Binary EVALUATE Operation definitions), then these operations would be encoded as follows:

| | |
|---|---|
| Line 1 | 3,1,2,0 |
| Line 2 | 3,1,3,0 |
| Line 3 | 3,2,0,2 |
| Line 4 | 3,1,0,4 |
| Line 5 | 3,2,0,4 |
| Line 6 | 3,3,0,4 |

Relocation is performed by the linker after it knows where all of the instructions and data will reside in the executable file. When a conventional relocation type (e.g., "GOTO instruction") is encountered, the value of the specified symbol e.g., LABEL1) is retrieved (0 is used if no symbol is given), and the addend (if used) is added to it. The data at the specified address is updated in a way determined by the relocation type, in a conventional manner.

Figure 3A:
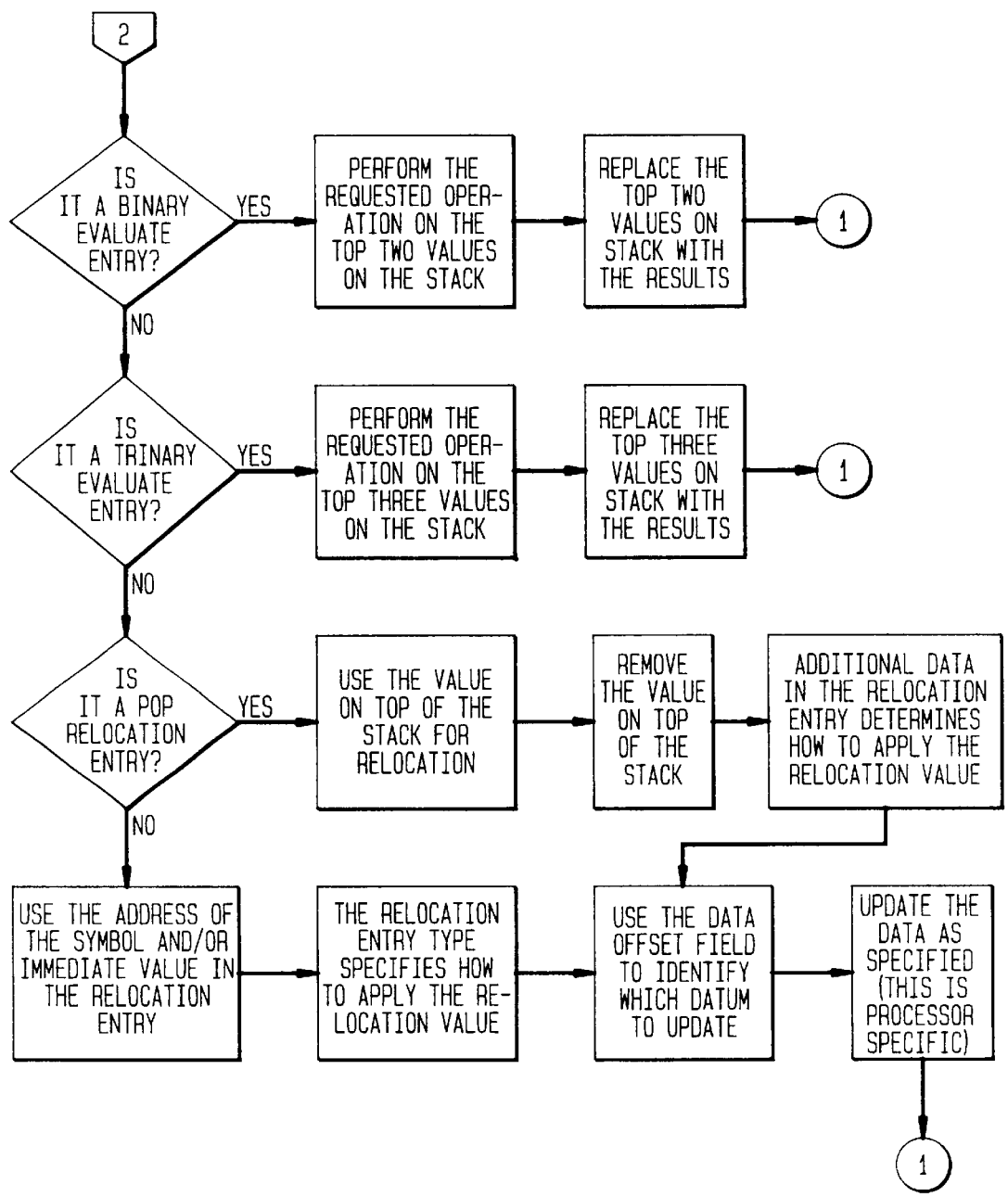

FIGS. 3 and 3A are a flowchart illustrating the operation of the present invention as described in more detail below. When a PUSH (a non-conventional relocation type) is encountered, the value of the symbol (plus the addend, if used) is pushed onto a stack, which is initially empty. If no symbol is specified, then the value in the addend field represents an "immediate value", i.e., a number that will be added, subtracted, or otherwise used in computation. When an EVALUATE relocation type is encountered, the addend field is used in a different manner than it is used under the prior art. When the EVALUATE relocation type is encountered the value in the addend field identifies what type of EVALUATE to execute, i.e., the addend is simply an identifying code. For example, in FIG. 2, a "2" in the addend field indicates a "SUBTRACT" function and a "4" indicates a "DIVISION" function, each as defined in the Binary EVALUATE Operation table discussed above. The selected function is performed on the top items on the stack (the top item for a UNARY EVALUATE, the top two items for a BINARY EVALUATE, and the top three items for a TRINARY EVALUATE). Once the EVALUATE function is performed, the items on the stack subjected to the EVALUATE function are replaced with the single result. When a POP is encountered, the addend field actually contains a conventional relocation type. The value on the top of the stack is removed from the stack and used to update the data at the address specified in a conventional manner.

Although only UNARY, BINARY and TRINARY evaluate operations are disclosed in detail, the EVALUATE operation need not be limited to one of these three. EVALUATE can support zero operands (e.g., to insert an irrational constant such as pi or e, or to access linker-provided information). It also supports a greater number of operands (e.g., to evaluate functions with four or more input arguments). Further, EVALUATE can directly access the stack for the purposes of getting operands or storing results without necessarily removing all operands from the stack and replacing them with the result (as is done in the preferred embodiment).

In the preferred embodiment, multiple relocation types are assigned to correspond to EVALUATE. At least one relocation type is assigned to each set of operand constraints that may be placed upon the EVALUATE operations (e.g., number of input operands, which may be UNARY, BINARY, or TRINARY). An alternative embodiment uses only one relocation type and encodes the operand constraints into the field that specifies the operation to be performed (the addend field in the preferred embodiment). Another alternative embodiment uses a separate field (such as the symbol pointer, contained in "r-info ") to specify the operand constraints. Although the only operand constraints recognized in the preferred embodiment are the number of input operands, additional constraints are possible. These could include, for example, whether to remove the operands from the stack, how to provide the results, or which of several stacks to use. Operand constraints could also be applied to the PUSH and POP operations (this would be needed if multiple stacks were used).

These operations can also be encoded without the use of an addend field. This can reduce the amount of coding required and also allows the use of the present invention with other formats that do not support an addend field, such as COFF (Common Object File Format). In such a case, if an EVALUATE relocation type is specified the symbol pointer of the "r_info" field would cause the EVALUATE operation (e.g. SUBTRACT) to be performed. Similarly, if a POP relocation type is specified, the symbol pointer of the "r_info" field would cause the POP operation (e.g., the previously mentioned "GOTO relocation" operation) to be performed. An additional PUSH IMMEDIATE relocation type would be used to specify constant values rather than symbols in the symbol field (which can be combined to build larger values that would not fit in the symbol pointer). In other words, the EVALUATE, POP, and PUSH IMMEDIATE relocation types use the symbol field in the same way that the EVALUATE, PUSH, and POP relocation entries use the addend field in the previously describe ELF format example.

It should be appreciated that variations and modifications of the herein described system and methods, within the scope of the invention will be apparent to those skilled in the art. Accordingly, the foregoing description should be taken as illustrative and not in a limiting sense.

We claim:

1. A method of resolving an arbitrarily-complex expression before it is inserted into an executable object file, said executable object file having at least one instruction and/or data item requiring relocation, comprising the steps of:

generating a relocatable object file having at least two relocation entries;

inserting one or more stack operations into each said relocation entry;

processing said relocatable object file with a linker; and outputting the result of said processing by said linker to said executable object file, wherein two or more of said relocation entries may be applied to a single instruction and/or data item.

2. A method as set forth in claim 1, wherein said stack operations are inserted in relocation entries of said relocatable object file.

3. A method as set forth in claim 1, wherein said stack operations comprise PUSH, POP, and EVALUATE operations.

4. A method as set forth in claim 1, wherein said stack operations comprise PUSH, PUSH IMMEDIATE, POP, and EVALUATE operations.

5. A method as set forth in claim 3, wherein said EVALUATE operations comprise UNARY, BINARY, and TRINARY EVALUATE operations.

6. A method as set forth in claim 4, wherein said EVALUATE operations comprise UNARY, BINARY, and TRINARY EVALUATE operations.

7. A method of resolving an arbitrarily-complex expression before it is inserted into an executable object file, said executable object file having at least one instruction and/or data file requiring relocation, comprising the steps of:

generating a relocatable object file having at least two relocation entries;

extending said relocation entries to include one or more stack operations;

resolving said arbitrarily-complex expression using said stack operations;

inserting the results of said resolved expression into said relocatable object file;

processing said relocatable object file with a linker; and outputting the result of said processing by said linker to said executable object file, wherein two or more of said relocation entries may be applied to a single instruction and/or data item.

8. A method as set forth in claim 7, wherein said stack operations are inserted in relocation entries of said relocatable object file.

9. A method as set forth in claim 7, wherein said stack operations comprise PUSH, POP, and EVALUATE operations.

10. A method as set forth in claim 7, wherein said stack operations comprise PUSH, PUSH IMMEDIATE, POP, and EVALUATE operations.

11. A method as set forth in claim 9, wherein said EVALUATE operations comprise UNARY, BINARY, and TRINARY EVALUATE operations.

12. A method as set forth in claim 10, wherein said EVALUATE operations comprise UNARY, BINARY, and TRINARY EVALUATE operations.

13. In a software system, a method of resolving an arbitrarily-complex operation before it is inserted into an executable object file, said executable object file having at least one instruction and/or item file requiring relocation, comprising the steps of:

generating a relocatable object file having at least one relocation entry;

extending said relocation entries to include one or more stack operations;

reading said extended relocation entries;

calculating a new value of the relocation entries using said stack operations;

inserting said new value into said relocatable object file;

processing said relocatable object file with a linker; and outputting the result of said processing by said linker to said executable object file, wherein two or more of said relocation entries may be applied to a single instruction and/or data item.

14. A method as set forth in claim 13, wherein said stack operations are inserted in relocation entries of said relocatable object file.

15. A method as set forth in claim 13, wherein said stack operations comprise PUSH, POP, and EVALUATE operations.

16. A method as set forth in claim 13, wherein said stack operations comprise PUSH, PUSH IMMEDIATE, POP, and EVALUATE operations.

17. A method as set forth in claim 15, wherein said EVALUATE operations comprise UNARY, BINARY, and TRINARY EVALUATE operations.

18. A method as set forth in claim 16, wherein said EVALUATE operations comprise UNARY, BINARY, and TRINARY EVALUATE operations.

19. A computer-implemented system for resolving arbitrarily-complex expressions in a relocatable object file at link-time, said system configured to perform the following steps:

extend the relocation entries of said relocatable object file to include stack operations;

resolve said arbitrarily-complex expressions using said stack operations; and insert the results of said resolved expressions into said relocatable object file.

20. A system as set forth in claim 19, wherein said stack operations are inserted in relocation entries of said relocatable object file.

21. A system as set forth in claim 19, wherein said stack operations comprise PUSH, POP, and EVALUATE operations.

22. A system as set forth in claim 19, wherein said stack operations comprise PUSH, PUSH IMMEDIATE, POP, and EVALUATE operations.

23. A system as set forth in claim 21, wherein said EVALUATE operations comprise UNARY, BINARY, and TRINARY EVALUATE operations.

24. A system as set forth in claim 22, wherein said EVALUATE operations comprise UNARY, BINARY, and TRINARY EVALUATE operations.

* * * * *